United States Patent
Piersol

(10) Patent No.: US 7,685,428 B2
(45) Date of Patent: Mar. 23, 2010

(54) TRANSMISSION OF EVENT MARKERS TO DATA STREAM RECORDER

(75) Inventor: Kurt Piersol, Santa Cruz, CA (US)

(73) Assignee: Ricoh Company, Ltd., Tokyo (JP)

( * ) Notice: Subject to any disclaimer, the term of this patent is extended or adjusted under 35 U.S.C. 154(b) by 1472 days.

(21) Appl. No.: 10/641,456

(22) Filed: Aug. 14, 2003

(65) Prior Publication Data

US 2005/0038794 A1 Feb. 17, 2005

(51) Int. Cl.
*H04L 9/32* (2006.01)
*H04L 9/00* (2006.01)
*G11B 27/10* (2006.01)
*H04N 5/91* (2006.01)

(52) U.S. Cl. .................... 713/178; 713/181; 386/57; 386/95

(58) Field of Classification Search ............. 380/218; 713/176–179, 181; 707/100; 705/59; 386/57, 386/95
See application file for complete search history.

(56) References Cited

U.S. PATENT DOCUMENTS

| | | | |
|---|---|---|---|
| 5,627,936 A * | 5/1997 | Prasad et al. | 386/96 |
| 5,793,869 A * | 8/1998 | Claflin, Jr. | 380/269 |
| 5,941,936 A * | 8/1999 | Taylor | 704/503 |
| 5,949,879 A * | 9/1999 | Berson et al. | 713/179 |
| 6,006,241 A * | 12/1999 | Purnaveja et al. | 715/512 |
| 6,148,094 A | 11/2000 | Kinsella | |
| 6,307,956 B1 | 10/2001 | Black | |
| 6,360,057 B1 | 3/2002 | Tsumagari et al. | |
| 6,424,385 B1 | 7/2002 | Koyama et al. | |
| 6,745,234 B1 * | 6/2004 | Philyaw et al. | 709/217 |
| 6,883,162 B2 * | 4/2005 | Jackson et al. | 717/124 |
| 6,898,709 B1 * | 5/2005 | Teppler | 713/178 |
| 6,950,623 B2 * | 9/2005 | Brown et al. | 455/3.01 |
| 6,954,859 B1 * | 10/2005 | Simerly et al. | 726/3 |
| 7,034,679 B2 * | 4/2006 | Flynn | 340/540 |
| 7,089,420 B1 * | 8/2006 | Durst et al. | 713/176 |
| 7,134,016 B1 * | 11/2006 | Harris | 713/168 |
| 7,149,957 B2 | 12/2006 | Hull et al. | |
| 7,215,436 B2 | 5/2007 | Hull et al. | |
| 7,263,659 B2 | 8/2007 | Hull et al. | |
| 7,263,671 B2 | 8/2007 | Hull et al. | |
| 7,266,782 B2 | 9/2007 | Hull et al. | |

(Continued)

FOREIGN PATENT DOCUMENTS

CA 2 386 829 A1 11/2002

(Continued)

OTHER PUBLICATIONS

Requirement for Restriction/Election for U.S. Appl. No. 10/618,201, Mailed Jan. 25, 2008, 9 pages.

(Continued)

*Primary Examiner*—Zachary A Davis
(74) *Attorney, Agent, or Firm*—Townsend and Townsend and Crew LLP

(57) ABSTRACT

An information stream (media stream) can be "bookmarked" with event markers to note points in time in the information stream of occurrences of interesting events. Repeat occurrences of an event are noted with the same event marker. The events of interest need not be a priori determined. In fact, unexpected events can be readily noted.

21 Claims, 9 Drawing Sheets

U.S. PATENT DOCUMENTS

| | | | |
|---|---|---|---|
| 2002/0172498 A1* | 11/2002 | Esenyan et al. | 386/69 |
| 2002/0199198 A1 | 12/2002 | Stonedahl | |
| 2003/0065925 A1* | 4/2003 | Shindo et al. | 713/178 |
| 2003/0231198 A1 | 12/2003 | Janevski | |
| 2004/0049681 A1* | 3/2004 | Diehl et al. | 713/178 |
| 2004/0073437 A1* | 4/2004 | Halgas et al. | 705/1 |
| 2004/0128514 A1* | 7/2004 | Rhoads | 713/176 |
| 2005/0008261 A1 | 1/2005 | Wolff et al. | |
| 2005/0010649 A1* | 1/2005 | Payne et al. | 709/217 |
| 2005/0038794 A1 | 2/2005 | Piersol | |
| 2005/0213153 A1 | 9/2005 | Hull et al. | |
| 2006/0136343 A1* | 6/2006 | Coley et al. | 705/59 |
| 2006/0171559 A1* | 8/2006 | Rhoads | 382/100 |

FOREIGN PATENT DOCUMENTS

| | | | |
|---|---|---|---|
| CA | 2386829 A1 * | 11/2002 | |
| JP | 11-338890 A | 12/1999 | |
| JP | 2000/322875 A | 11/2000 | |
| JP | 2001/109080 A | 4/2001 | |
| JP | 2002/159004 A | 5/2002 | |
| JP | 2003/153191 A | 5/2003 | |
| JP | 2003/167692 A | 6/2003 | |
| WO | WO 02/082316 A1 | 10/2002 | |

OTHER PUBLICATIONS

Non-Final Office Action for U.S. Appl. No. 10/618,201, Mailed Apr. 3, 2008, 17 pages.

Final Office Action for U.S. Appl. No. 10/618,201, Mailed Jan. 2, 2009, 19 pages.

Non-Final Office Action for U.S. Appl. No. 10/618,201, mailed Jul. 22, 2009, 19 pages.

* cited by examiner

TRANSMISSION OF EVENT MARKERS TO DATA STREAM RECORDER

CROSS-REFERENCES TO RELATED APPLICATIONS

This application is related to the following commonly owned and co-pending U.S. patent applications which are hereby incorporated by reference for all purposes:

U.S. application Ser. No. 10/618,201 titled "Associating Pre-generated Indicia with Temporal Events," filed Jul. 11, 2003;

U.S. application Ser. No. 10/175,540 titled "Device For Generating A Multimedia Paper Document," filed Jun. 18, 2002, now U.S. Pat. No. 7,215,436, issued May 8, 2007;

U.S. application Ser. No. 10/001,895 titled "Paper-Based Interface For Multimedia Information," filed Nov. 19, 2001, now U.S. Pat. No. 7,263,659, issued Aug. 28, 2007;

U.S. application Ser. No. 10/001,894 titled "Techniques for Retrieving Multimedia Information Using A Paper-Based Interface," filed Nov. 19, 2001 now U.S. Pat. No. 7,149,957, issued Dec. 12, 2006;

U.S. application Ser. No. 10/001,893 titled "Techniques for Generating A Coversheet For A Paper-Based Interface for Multimedia Information," filed Nov. 19, 2001, now U.S. Pat. No. 7,266,782, issued Sep. 4, 2007;

U.S. application Ser. No. 10/001,891 titled "Paper-Based Interface for Multimedia Information Stored by Multiple Multimedia Documents," filed Nov. 19, 2001; and U.S. application Ser. No. 10/001,849 titled "Techniques for Annotating Multimedia Information," filed Nov. 19, 2001, now U.S. Pat. No. 7,263,671, issued Aug. 28, 2007.

BACKGROUND OF THE INVENTION

The present invention relates generally to processing an information stream and more particularly to presenting portions of an information stream.

It is oftentimes desirable to be able to index a media stream and then later to access the media stream based on the indexing activity. Consider a concrete example where the setting is a marketing research effort.

Sociologists engaging in market research often observe focus groups to understand behavior. They take written notes as a complement to a video recording of a session. Conventionally, moderators study the behavior of the focus group. The moderators may synchronize their watches to the video time so that they can correlate their observations and notes with the video recording when they review the video.

In one scenario, a marketing researcher could observe members of a focus group unwrapping a prototype package. During the session, the focus group moderator records video of the participants' actions while unwrapping the package, making notes of important events and flagging them for later review. For example, the moderator may expect to see certain events such as "uses scissors," "removes foil," and so on. Each time, a member of the focus group "uses scissors" to open the package, one or more moderators will note the time of the activity in her notebook. If a member of the focus group "removes foil," the time of occurrence of that activity is noted in a notebook.

A subsequent review of the video recording and the moderators' notes may require substantial effort to collate and organize the information. This effort can be especially tedious if it is also necessary to correlate the noted events recorded in the various notebooks. This might require searching through the potentially many hours of one or more video recordings to obtain snippets of video corresponding to the times of the events noted in the notebooks from many moderators.

A need therefore arises to facilitate the presentation of recorded information. There is a need for the capability of identifying noted events in the recorded information and the ability to access the recorded information at the times corresponding to the noted events.

SUMMARY OF THE INVENTION

In accordance with various aspects of the present invention, an information stream (media stream) can be timestamped with event markers to indicate points of interest in the information stream. Repeated occurrences of an interesting event in the information stream can be timestamped with the same marker. The timestamped information (media) stream can be presented on a suitable medium where segments of the information stream having the same timestamp can be grouped together to facilitate subsequent review of the information stream.

BRIEF DESCRIPTION OF THE DRAWINGS

An understanding of the present invention is provided by the following figures along with the discussion that follows, where.

DESCRIPTION OF THE SPECIFIC EMBODIMENTS

Figure 1:
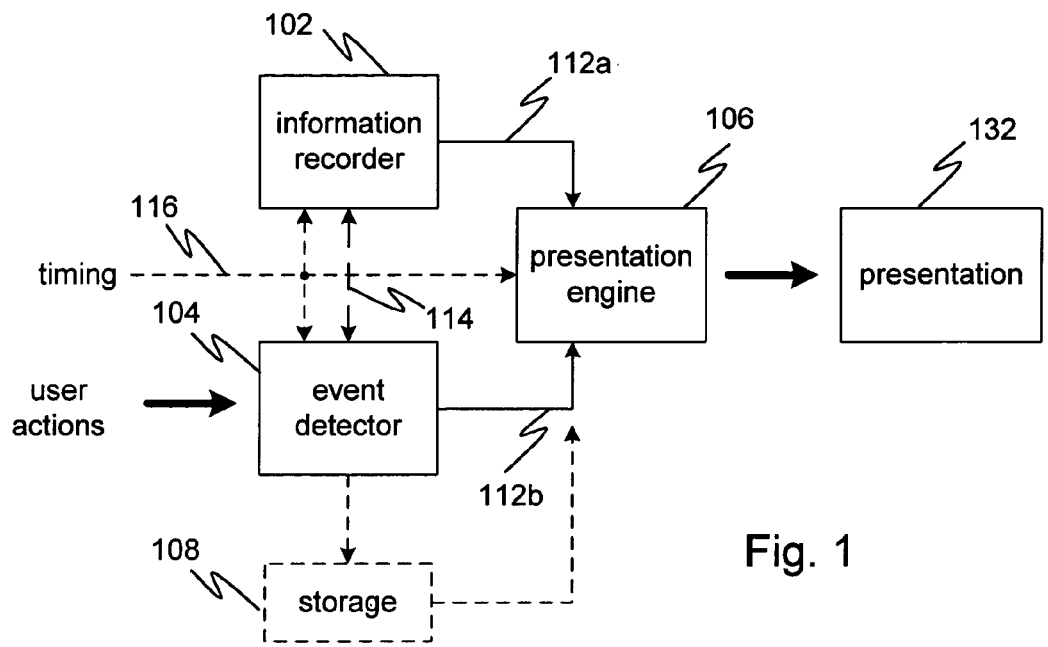
FIG. 1 is a high level general block diagram illustrating aspects of the present invention.

FIG. 1 is a high-level block diagram of an event marking system, illustrating various aspects of the present invention. An information recorder 102 produces a recording of "something." The "something" might be an audio-visual recording; e.g., a recording of the activity of a group of people interacting with each other. The recording can be a series of images. One might record the output of a sensor; for example, force transducers in a processing plant might be used to monitor pressure, load forces, and the like to produce a series of sensor readings that can be recorded. The information stream therefore can be any form of data such as audio, video, raw data (sensor data), or any other time-based media.

As alluded to above, the information recorder 102 produces an information (media) stream. In the case of an audio-visual recording or the like, the information stream would be a continuous stream. Alternatively, the information stream may comprise discrete information, as in the case for example of a digital camera producing a series of images. In the sensor example, the information stream can be a continuous recording of the instantaneous reading of the sensor(s), or the information stream can be discrete data representative of readings taken at discrete time intervals.

In the discussion which follows, the term "information" will be used to refer to the recorded stream of information being processed, whether digital information or analog information. A common information stream is a media (multi-media) stream comprising audio-visual information. However, the present invention is equally applicable to streams of information other than audio or visual data. As mentioned above, sensor data can be recorded over a period of time for monitoring purposes. While not normally associated with multi-media streams, such data can be treated as a data stream that can be timestamped and processed in accordance with the present invention.

An event marker 104 (shown in FIG. 1 as an "event detector") is used by a user to signify the occurrence of events. When the user observes a noteworthy event, she will act in a predetermined manner to trigger the event marker ("marking the event"). In response, the event marker marks the occurrence of the triggering action along with suitable timing information to produce timestamped markers, indicating what event occurred and when the event occurred. In the case of multiple recording devices, information indicative of the particular recording device with which the event marker is associated can be included in the timestamped markers. As will be discussed in more detail below, one such trigger action is the scanning of a barcode. Other triggering actions might include the user speaking a phrase, making a selection of a computer graphic on a visual display or otherwise making some detectable gesture. According to an aspect of the invention, repeat occurrences of a noteworthy event are marked by the same triggering action. For example, each time a person enters a room, that event can be marked by scanning the same barcode, or by speaking the same phrase, and so on.

The trigger action can be noted by recording a representation of the specific trigger action (e.g., a barcode is represented by a number), and recording a time index or some other suitable timing information of the occurrence of the triggering event. The timing information 116 can be a timing source that is common to the information recorder 102 and to the event marker 104. Alternatively, the timing information can be derived by the information recorder and by the event marker independently of each other; for example, each device may have its own clock. The event marker 104 can be configured to record the timestamped markers (timestamps) in storage provided within the device, and thus requires no interaction with the information recorder during recording. Alternatively, the event marker can be configured to communicate the timestamps to the information recorder over a communication link 114 or to a remote storage component (not shown), if the event marker is not equipped with suitable storage.

A presentation engine 106 receives the information stream 112a from the information recorder 102 and a set of timestamps 112b from the event marker 104 (or from a storage component). The presentation engine synchronizes the information stream with the timestamps to correlate each triggering event with a portion of the information stream. The presentation engine then generates a suitable presentation 132 of one or more portions of the information stream, as identified by the timestamps. Alternatively, the event marker 104 can store the timestamp information in a storage component 108; e.g., in a timestamp file or the like. The presentation engine can then access the timestamp information from the timestamp file.

The presentation 132 can be formed on a printable medium. Alternatively, the presentation can be made on a visual display device, such as on a computer terminal or on a handheld device. The presentation can be virtual; e.g., a virtual reality device such as a heads-up display can be used to project the presentation.

Figure 1A:
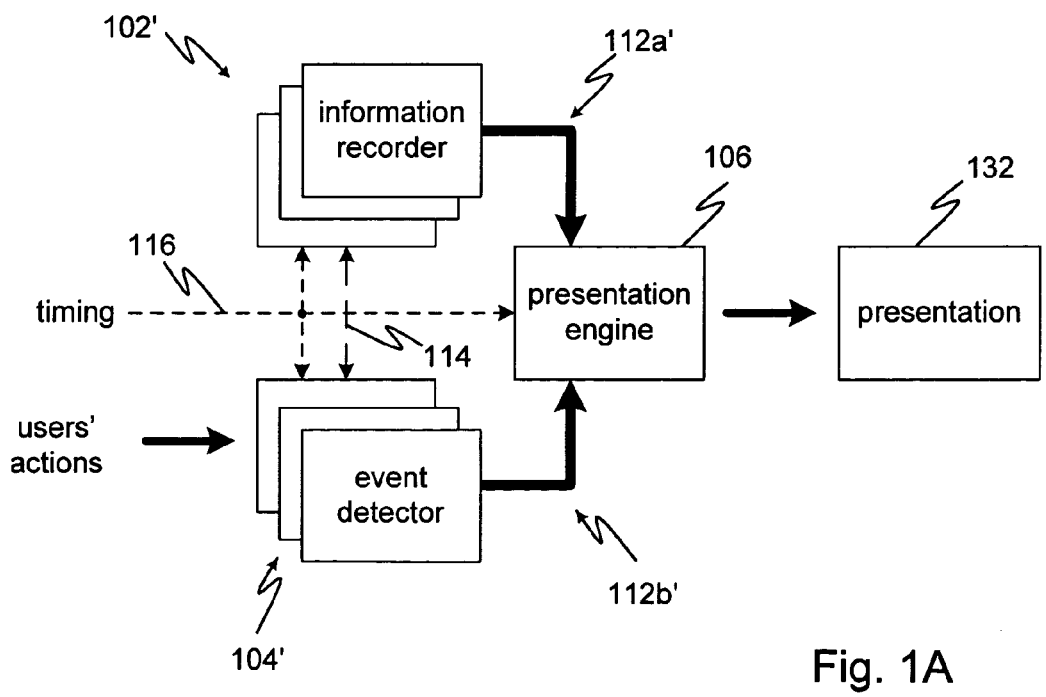
FIG. 1A shows an aspect of the present invention in which plural information streams and/or plural event marker streams can be produced.

FIG. 1A illustrates another aspect of the invention wherein more than one information recorder 102' can be provided. In this configuration, the information stream 112a' will comprise one or more separate streams, representing information streams from each of the information recorders. Alternatively, some information recorders might be configured to combine their outputs to produce a single stream.

FIG. 1A also shows a further aspect of the invention in which one or more users using one or more event markers 104' can trigger events to be recorded. The flow 112b' represents one or more streams of timestamped markers from the one or more event markers. As will be discussed in further detail, the timestamped markers may include additional information to identify the specific event marker 104' that produced the timestamped marker.

Figure 2:
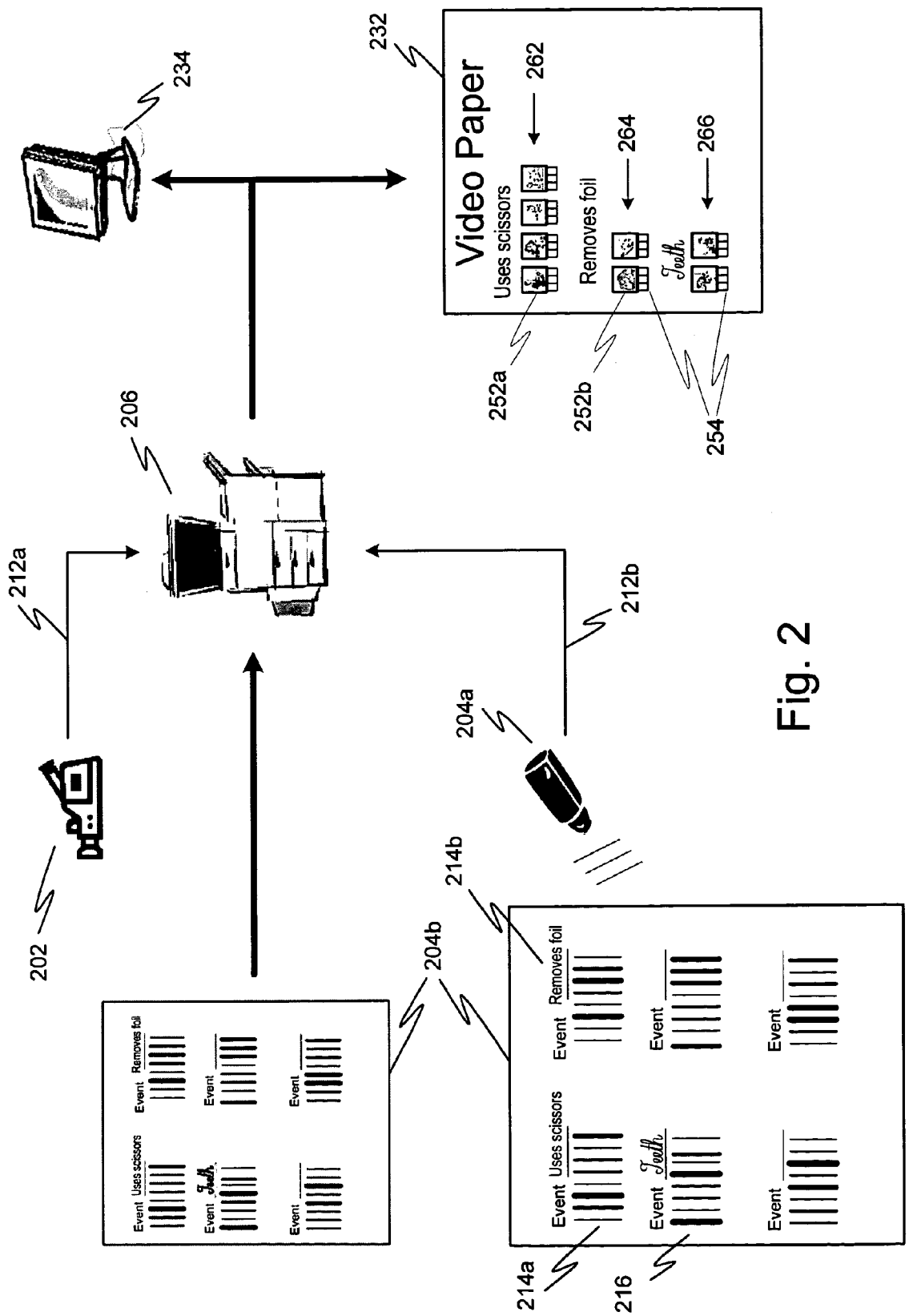
FIG. 2 is a general block diagram of an illustrative embodiment of the present invention.

FIG. 2 is an illustrative embodiment of an event-marking system, showing an example of a specific implementation. A recorder 202 can be a digital recorder that provides a continuous information stream 212a to a multi-function peripheral (MFP) 206. Alternatively, the recorder can be a digital camera that feeds a discrete information stream of images to the MFP.

In accordance with the specific implementation shown in FIG. 2, events can be marked using a barcode reader 204a to scan in barcodes 204b to produce a set of timestamped markers. First, the user is provided with a sheet of pre-printed barcodes 204b, which are unique and are not associated a priori with any event or context; the barcodes are initially "blank."

When the user is ready, she can assign event names to each barcode in accordance with a given particular use. For example, an observer in a product testing group for a new package may be interested in studying events such as "person used scissors to open the package," or "person removed the foil from the package." She could assign each event to a barcode 214a, 214b, as shown in FIG. 2. As shown in the figure, the observer can leave some barcodes unassigned.

During the observation session, participants' activities will be recorded with a suitable recording device(s) to create a recording of the session. Whenever the observer notices someone using scissors to open a package, she can scan the barcode 214a associated with that event to indicate its occurrence by marking the event. Similarly, the occurrence of someone lifting a foil from the package can be noted by scanning the barcode 214b associated the "removed the foil" event. In this way, the information stream (here, a recorded session) can in effect be timestamped with barcodes. In accordance with an aspect of the invention, repeated occurrences of an event can be noted by repeated scannings of the barcode associated with that event. Consequently, a given barcode may very well appear more than once in the timestamped information stream.

The scanned barcodes are converted to a data stream and can be stored in the barcode reader 204a, along with suitable timing information. The data stream along with the timing information can be later communicated to a data collection station. Alternatively, the data can be communicated as it is being collected. If a particular barcode reader lacks adequate long term storage capacity, the data stream and any needed timing information can be communicated (e.g., wirelessly) to a separate data collection station (not shown). As will be discussed below, the timing information can be relative or absolute timing information.

In accordance with an aspect of the invention, the meaning of a barcode need not be provided in advance of the observation session. For example, the observer may witness an unexpected behavior such as someone opening a bag using his teeth. The observer can scan one of the unassigned barcodes 216 upon seeing the unexpected behavior, and from that point on scan the same barcode each time a "uses teeth" behavior is observed. The observer can mark the barcode sheet 204a with the event name "teeth" as shown in the figure to identify the new behavior. Further detail and variations of this aspect of the invention will be discussed below.

The MFP 206 receives the information stream 212a from the recording device and, likewise, receives the scanned barcodes 212b that were collected by the barcode reader 204a. The MFP processes the information stream to "timestamp" the information stream with the barcodes. The scanned barcodes represent a specific example of "timestamped markers." The act of associating the scanned barcodes with points in time in the information stream represents a specific example of "timestamping" the information stream. Further detail and variations of this aspect of the invention will be discussed below.

When the barcode sheet 204b is fed into the MFP, the MFP can produce a presentation 232 of the timestamped information stream. For example, the images shown in the example of FIG. 2 represent the timestamped markers that were collected during the study session. In the particular implementation shown in FIG. 2, the presentation 232 can be a "video paper" output. Video paper is a technology for presenting audio-visual information on a printable medium such as paper. This technology is discussed in more detail in one or more of the above-referenced co-pending applications. The video paper presentation 232 includes representative thumbnail images 252a, 252b of portions of the information stream that have been timestamped. Those portions of the information stream that are timestamped with the same barcode can be "grouped" together on the video paper.

The arrangement of the groups can be directed by any of a number of ways. In one case, a simple grouping with some automatic layout can be used, where the arrangement is made absent any input of arrangement information from a user. For example, a simple listing that is not specific to the particular collection of barcodes. In another case, an electronic representation of the format of the document that contained the original barcodes can be used to direct the formatting of the generated the output. This electronic format might include explicit space for insertion of the clips. In yet another case, a paper prepared by a user containing the barcodes along with other marks on the paper can be used to direct the arrangement. The paper can be scanned and a new version of the scanned image is generated with the clips inserted depending on the location of the barcodes in the paper.

In the case of an audio-visual information stream, a representative thumbnail image might be a frame of video. Thus, the images 262 relating to the event "uses scissors" are shown grouped together. Similarly, the images 264 relating to the event "removes foil" are shown grouped together. Likewise, the images 266 relating to the unexpected event "teeth" are shown grouped together. Recall that although the "uses teeth" event was unexpected, the invention nonetheless allows the user to identify occurrences of the unexpected event in the information stream, and to later group together occurrences of the unexpected event.

The labels appearing in the video paper that are used to identify the groups can be taken from the barcode sheet 204b. The MFP 206 can perform simple "cut" operations on predefined locations of a scanned-in image of the barcode sheet to obtain segments containing the user-provided event names, including the names of those unexpected events. Subsequent "paste" operations can be performed on the video paper image to provide the group labels in the video paper, as exemplified in the figure. It can be appreciated that optical character recognition (OCR) processing can be applied to extract text written in the predefined locations. However, the cut-and-paste approach would preserve any non-textual markings that the user might make in addition to the text.

For example, in accordance with an implementation of the cut-and-paste technique, the image of the scanned barcode sheet (with its user-provided markings) can be compared with an electronic image of the sheet as originally printed, using well-known matching algorithms. Any regions containing differences could be extracted and placed on the sheet to be printed, the differences being the user-made markings.

In an alternative implementation, an output image (e.g., video paper image) can be produced based on the scanned-in image of the barcode sheet as marked up by the user. The MFP 206 can locate each barcode in the scanned barcode sheet and immediately below each barcode insert sufficient space in the output image to accommodate all the clips associated with that barcode. The remaining portion of the image of the scanned barcode sheet would be "pushed down" to make this space. New flow, such as repositioning page breaks, could be used as appropriate to format the output image.

A feature of the video paper 232 is that the user can subsequently access portions of the information stream represented by the thumbnail images. This constitutes a playback mode of operation. Briefly, each thumbnail image formed on the video paper has associated with it a graphical indicium, such as a barcode 254. When a user scans the barcode, the barcode id is transmitted to a playback device (not shown). The playback device can then access the information stream and playback the portion of the information stream associated with the thumbnail image. Additional detail about this aspect of video paper can be found in one or more of the above-referenced applications. It can be appreciated that the video paper component of this particular embodiment of the invention can be used to create, store, and manage additional information to further facilitate access to the information stream.

FIG. 2 shows that the presentation can be made on a video display device 234. It can be appreciated that a suitable user interface can be provided to allow a user to access those portions of the information stream that are timestamped with the same barcode. For example, a display much like the image appearing on the video paper 232 can be presented on a video display device. Using an appropriate input device, a user can select a thumbnail image and view the corresponding portion of the information stream. For example, a ten second snippet of the information stream can be played back. Alternatively, the user interface might allow playback of the information stream starting from a location determined based on the timestamp associated with the selected thumbnail image. These and other playback aspects of the invention will be discussed in further detail below.

Event Markers

Figure 5:
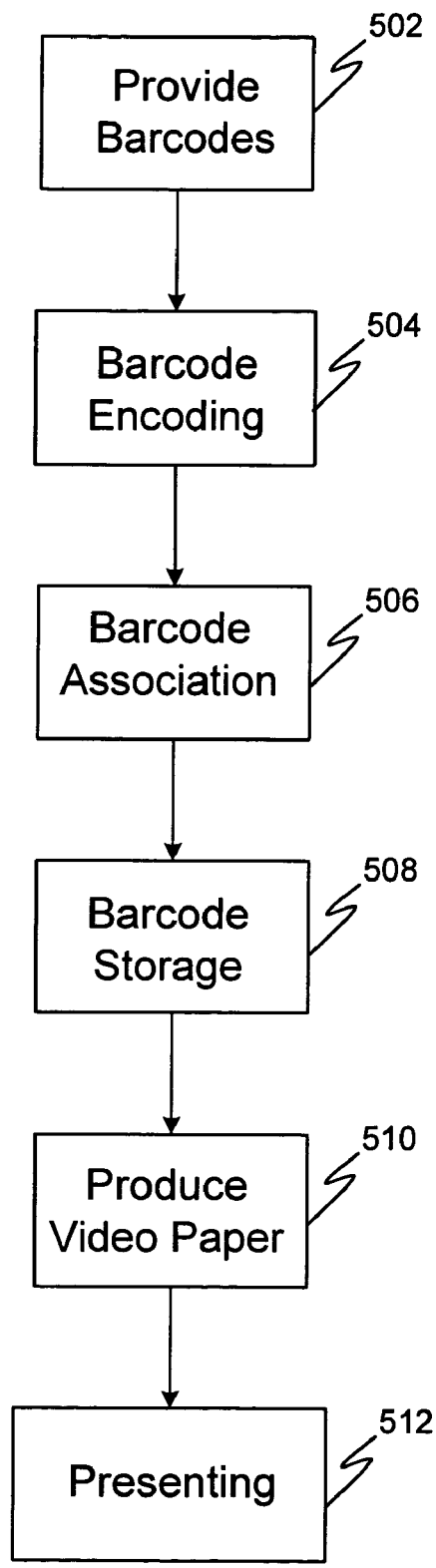
FIG. 5 is a flowchart highlighting the steps of a particular implementation of the present invention.

Steps for timestamping an information stream in accordance with an embodiment of the present invention are highlighted in FIG. 5. It will be appreciated from the discussion which follows that some steps need not be performed in the order shown in the flowchart. The steps are merely laid out in a flow chart format for convenience of the discussion.

Generally, a set of event markers is provided on a sheet of event markers, as a source of blank markers. In a step 502 of the particular embodiment of this aspect of the invention, the event markers are a set of unique pre-printed barcodes. The pre-printed barcodes can be manufactured and distributed to retailers, who then sell them to end users. The barcodes can be provided as pre-printed sheets of paper 204*b* (FIG. 2), provided on a roll of stickers, provided in a notebook format, and so on.

As mentioned above, barcodes are used in a specific implementation of this aspect of the invention, and an information stream is "timestamped" to mark events of interest by scanning in barcodes corresponding to those events. However, as will be discussed shortly, other forms of markers are possible.

In particular embodiments of the invention, the barcodes will be represented in a form suitable for the underlying technology (step 504). Thus, in the case of a software-based embodiment, the markers are likely to be represented by the software as unique numbers (marker ID); e.g., N-bit data.

One reason that uniquely identified markers might be preferable is to avoid collisions. For example, if the same scanning device is used in two different projects there is no danger of confusing the timestamped events of project A with those of project B. Also, additional markers can be added at any time without concern for collisions with existing markers. The use of unique markers allows for an unlimited ID space, which would not be possible if the markers were tied to an input device. For example, generating markers which correspond to the buttons of a 3-button mouse would limit the ID space to three different markers, and thus three events. A full keyboard could provide about 100 unique markers, though somewhat unwieldy to use and still quite limited as to number of events.

A second reason to use uniquely identifiable barcodes is that they can be used to associate specific pieces of paper with event markers. For example, the ability to tie a specific police officer's investigative notebook page with an event marker can be useful for establishing the presence of the officer at a particular event. If several markers were placed on each page of such a notebook, then their presence in context provides strong evidence that the officer was indeed the person who marked a particular event. Since the marks and barcodes are "entangled" with real world events about which testimony can be obtained, they provide a stronger chain of evidence that a specific person marked specific events.

It can be appreciated that uniquely identifiable "markers" other than barcodes can be used to timestamp an information stream. For example, the user can be provided with a visual interface on a video device such as a tablet PC, for example. The visual interface might have a set of graphics such as a set of checkboxes. Each checkbox can be uniquely identified. A user can associate some of those checkboxes with specific events particular to the observations being studied; e.g. "gate opens," "person enters room," "rat eats cereal," "rat eats cheese," and so on. For example, the interface can provide an input screen which allows a user to enter descriptive information for an event that can be associated with a checkbox.

Each time an event is observed, the corresponding checkbox can be "selected" using a suitable input device, thus marking the event. The interface can then record the specific identity of the checkbox and associate timing information indicating when that particular checkbox was selected, thus creating a timestamped marker. This information provides a basis for timestamping a corresponding information stream with the checkbox identifiers. As with the barcodes, the user can leave some checkboxes unassigned. The unassigned checkboxes can then be assigned on the fly when unexpected events occur.

In the foregoing embodiments, a set of predetermined markers were provided to the user. For example, pre-printed barcodes had to be provided, or checkboxes on a graphical interface were presented to the user. These predetermined markers serve as visual cues for making an association with an event.

In accordance with an alternative embodiment of this aspect of the invention, a voice-based event marker can be used to timestamp an information stream. This particular embodiment of the invention obviates the use of pre-defined, pre-printed markers; the markers can be defined on the fly, during the observation session. The observer simply speaks a particular phrase when a certain behavior (event) occurs; e.g., "uses scissors," "lifts foil," "teeth!" and so on. Suitable voice recognition processing can be applied to capture the speech, analyze it, and associate a unique identifier with the recognized speech. Thus, each time the user speaks "uses scissors," the voice recognition process can produce and store the same unique identifier along with any needed timestamping related information. In this way, the information stream can be timestamped with the spoken observations.

A further aspect of the present invention is the encoding of associated information along with a timestamped marker when an event is marked. Thus, in addition to storing an identifier (marker ID) that uniquely identifies the marker (e.g., barcode) when an event is marked, a device identifier (device ID) which indicates the specific recording device can be associated with the marker ID. According to one implementation, the device identifier can be determined by scanning a barcode that is associated with the recording device. The device identifying barcode can be formed on the recording device itself. The user simply scans the barcode on the recording device. The device identifying barcode can be printed on an operator's manual associated with the recording device, or it can be printed on a sheet of barcodes that is associated with the recording device. According to another implementation, the device identifying barcode can be manually entered as a sequence of key presses made on the scanning device. It can be appreciated that still other implementations are possible. For example, in accordance with another implementation, a device identifier can be programmed into the recording device at the factory.

Storing the recording device identifier creates an association between the timestamped markers (timestamps) and the recording device. This aspect of the invention is especially useful where multiple sources of information streams and multiple sets of timestamps may be presented to an MFP 206 device. The MFP (or other similar device) can access the proper information stream based on the device ID that is associated with a given set of timestamps, without requiring the user to manually indicate which information streams go with which set of timestamps.

Other associated information can include information which identifies the user. This allows the MFP to access portions of the information stream(s) that were timestamped by a particular user. It can be appreciated that still other useful information can be associated with a timestamp.

Figure 4:
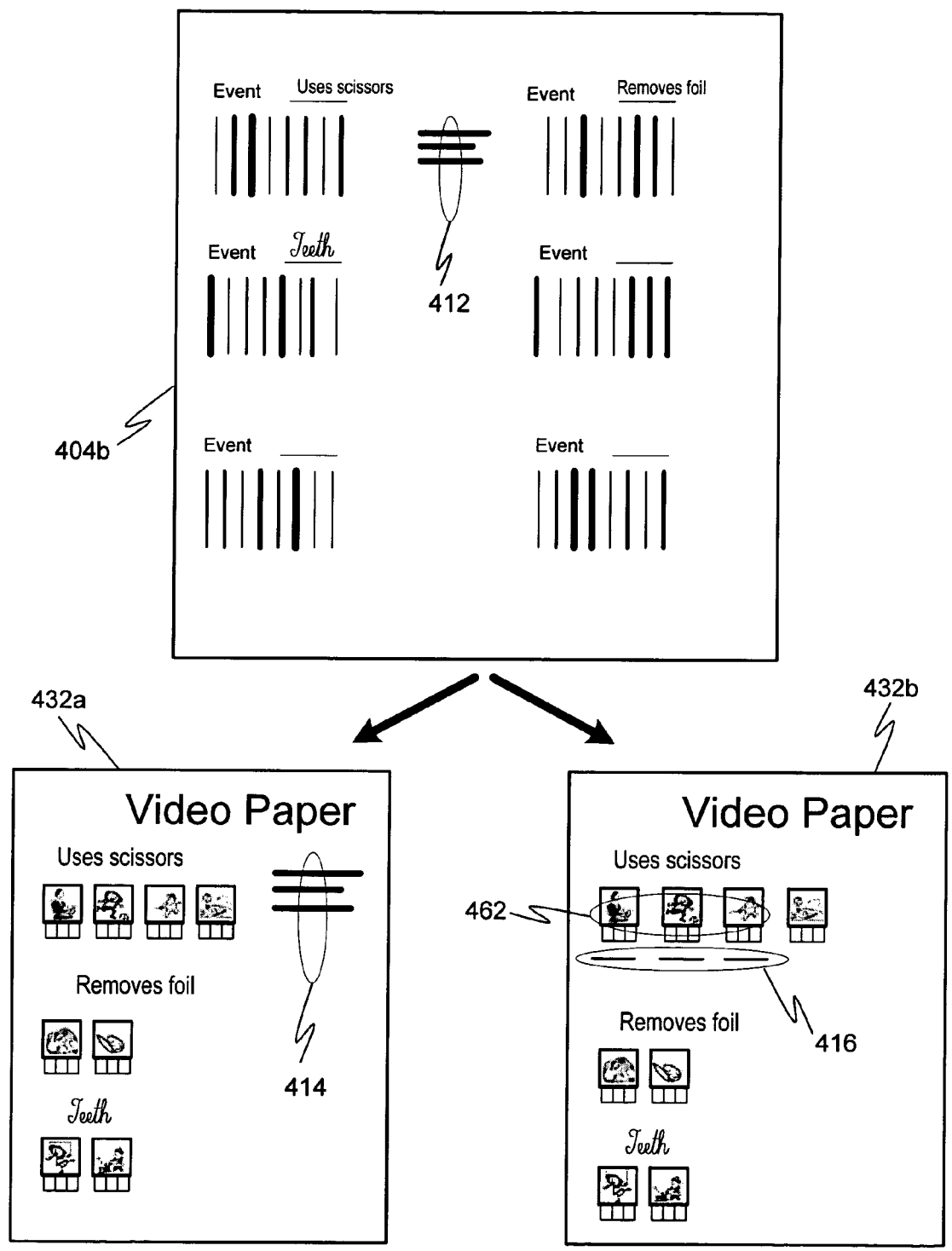
FIG. 4 illustrates various embodiments for a paper presentation.

FIG. 4 shows that annotations can be associated with each event marker. Thus, in a particular embodiment, a barcode sheet 404*b* similar to the barcode sheet 204*b* in FIG. 2 can contain annotations 412 made by the observer which are associated with a particular event marker. FIG. 4 shows that the annotations are associated with the event marker for "uses scissors." The annotations can then be presented in a video paper printout 432*a* as annotative information 414 associated with the group of icons corresponding to the annotated event marker. As mentioned above, the MFP 206 can perform a "cut" operation in a predefined area in an image of the barcode sheet where the user can make annotations. A subsequent "paste" operation can then be made to place the annotations into the video paper output 432*a*.

FIG. 4 illustrates an alternative embodiment in which the annotative area in the barcode sheet 404*b* is divided into N portions. In accordance with this embodiment, each portion (e.g., line of text) is an annotation that can be associated with an occurrence of the event corresponding to the marker. However, due to obvious physical limitations, there is only enough space for N occurrences of an event. In the barcode sheet 404*b*, assume that N is 3. The video paper might look like the output 432*b*. Where, the first three thumbnails 462 for the event "uses scissor" are annotated, but subsequent occurrences of the event are not annotated.

Timestamping the Information Stream

Referring again to FIG. 5, a step 506 is shown of "barcode association." An aspect of the present invention is the notion of "timestamping" an information stream with event markers. A further aspect of the invention is that points in the information stream can be timestamped with the same event marker to indicate the occurrence of the "same" event. It is worth noting at this time, that the idea of "sameness" is defined by the user, and does not require any a priori determination or assessment by the system of the content of the information stream. As mentioned above, this allows a user to mark the information stream with "unassigned" markers to mark occurrences of unexpected events. In fact, the notion of marking with voice-originated markers highlights an aspect of the invention wherein the markers themselves do not have to be predefined.

In the specific embodiment of FIG. 2, the event markers are barcodes, more particularly, suitable representations of the barcodes such as a unique number. However, as discussed above, other "markers" can be used. In accordance with the present invention, markers are uniquely identified and some form of timing information is associated with each marker. More particularly, when an event marker is produced, the time of production is associated with the event marker. Thus, for example, given a set of barcodes, when one of the barcodes is scanned, the event marker is represented by the scanned barcode; and associated with that event marker is the time at which the barcode was scanned. In the case of a voice-based event marker, the event can be associated with the time when the event was spoken. This allows for markers to be time-wise correlated with the information stream. This creates information that associates each occurrence of a marker with a point in time in the information stream. Associating (step 506) the information stream with the markers in this way effectively "timestamps" the information stream with the markers.

Figure 3:
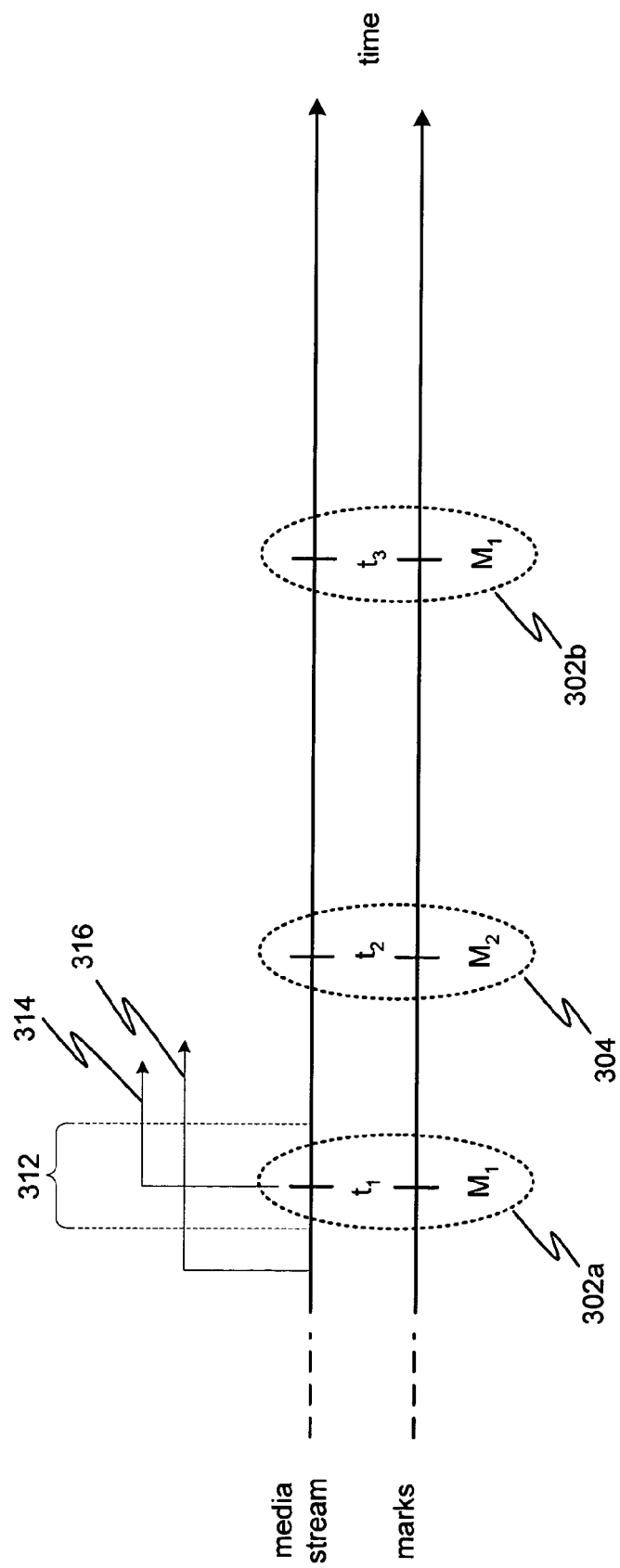
FIG. 3 illustrates timestamping of an information stream.

Referring to FIG. 3, for example, suppose a mark $M_1$ had been timestamped at time $t_1$; i.e., a first barcode was scanned at time $t_1$, or a first phrase was spoken at time $t_1$. Suppose further that a mark $M_2$ was timestamped at time $t_2$, and that the mark $M_1$ was again timestamped at time $t_3$. In accordance with the invention, the mark $M_1$ would be associated with the information stream at time $t_1$ (302*a*) and with the information stream at time $t_3$ (302*b*). Likewise, the mark $M_2$ would be associated with the information stream at time $t_2$ (304).

The association of a mark with one or more times can be represented in many ways. For example, in one embodiment, the mark-to-time association can have the following data structure:

$M_1$: 12:32:05, 12:35:22, 12:38:14
$M_2$: 12:34:19, and so on.

Alternatively, the mark-to-time association can have the following data structure:

$M_1$: 12:32:05
$M_1$: 12:35:22
$M_1$: 12:38:14
$M_2$: 12:34:19, and so on.

One of ordinary skill will readily appreciate that still other representational structures can be used.

From the foregoing description, those of ordinary skill can readily embody this aspect of the invention in any of a number of ways. In a particular embodiment of the invention, the MFP 206 receives the information stream and a "stream" of timestamps (i.e., markers with suitable timing information), and correlates the information stream with the timestamps on the fly, to produce for example a video paper 232 output. Alternatively, a table can be maintained that provides a pointer into the information stream file(s) for each timestamp. This internal representation would facilitate a video display presentation of the timestamped information stream, obviating the need for repeatedly re-indexing the information stream.

In accordance with a particular implementation of this aspect of the invention, a data structure is created for each marked event (timestamp). The data structure includes the id of the marker, the time of the event, a pointer to the information stream (media), and begin and end points for playback. The begin and end points can be modified at a later time even after the video paper has been printed.

As mentioned above, some form of timing information is associated with the markers. It can be appreciated that this information allows for the information stream to be synchronized with the markers. In accordance with one embodiment of the invention, absolute time can be used. Thus, the information stream can have an absolute time value associated with it. In the case of discrete media, such as images from a digital camera, each image can be associated with a time value. The recording device 202 might have a clock or other suitable time base for associating a time value with the information stream.

Similarly, the event marking device such as the barcode scanner 204*a* might include a clock so that for each marking event the device produces a datum representing the marker (e.g., a unique number representing a barcode, or digitized speech, etc.) and a datum representing the time at which the mark was made (e.g., scanned barcode, spoken speech). In this particular embodiment, the information stream and the set of markers with their corresponding time values collectively represent a timestamped information stream. This technique is applicable for both continuous and discrete information streams; especially so for discrete media since each "frame" is marked with a time value. The process of timestamping, then, amounts to matching the time values associated with each marker with the time values in the information stream. In practice, an exact match is not guaranteed due to clock skew between the time base in the event marker (e.g., barcode scanner) and the time base in the recorder. Thus, a margin of error should be provided; the amount of the error, whether milliseconds, seconds, minutes, etc., will depend on the nature of the subject being recorded.

A more appropriate technique for synchronizing continuous information streams might be to establish a temporal reference point where time can be measured relative to that reference point. For example, the information stream might include a reference point at the beginning which can be used to "zero out" a timer in the event marking device (e.g., barcode scanner). A special signal can be inserted at the beginning of the media that the system (e.g., an MFP) can detect. Thus, a marking event that occurs five minutes after the timer was zeroed out would correspond to a point in the information stream that was five minutes into the information stream measured from the special signal. Additional reference points can be provided to periodically re-synch the clocks in the recorder and the event marking device to account for clock drift, if timing is critical. It can be appreciated of course that additional information would be needed to indicate occurrences of clock re-synchs.

Another technique for synchronizing an information stream to a series of event markers, is the use of START-STOP indicators. In this scenario, a barcode labeled START is scanned at approximately the same time as the recording device is started. When the barcode data and video are merged, the system recognizes the START indicator and maps the associated time to the beginning of the video. Thus, the offset from this time to a timestamp associated with another barcode is used to index into the video recording and pull out the appropriate clip. Optionally, a STOP code can be scanned when the recording is complete. This would be especially useful if several recording sessions are contained in a single information stream; e.g., on a single video tape. In that case, the portion of the information stream between a STOP indicator and the next START indicator can be factored out when indexing from the timestamp IDs to the video.

Alternatively, a "START marking event" indicator and a "STOP marking that event" indicator can be employed. Each event of interest can then be delimited by these pair of indicators. In addition, surrounding context for each delimited event can be provided by padding the beginning and/or end of each delimited event with a segment(s) of the information stream. The surrounding context can be provided, for example, during playback.

FIG. 5 shows a step 508 of "barcode storage." In accordance with one aspect of the invention, the timestamp information can be stored in the event marker device 104 (FIG. 1) itself. Thus, in a particular embodiment of the invention, the barcode scanner might be configured with a suitable memory component to store the timestamps. The memory component can be a form of non-volatile memory if it is anticipated that the device might be turned on and off while collecting data. A disk drive unit might be provided. The timestamp information might include an encoding of the scanned barcode plus some timing information that indicates when each barcode was scanned. Additional information might include metrics such as the number of times each barcode was scanned.

The barcode scanner (and more generally, an event marker device 104) can be configured to communicate the stored timestamps to a suitable mass storage device for subsequent processing. Alternatively, the event marker device can be configured to transmit a timestamp as soon as it receives one, thus obviating the need to provide suitable storage for timestamps in the event marker device itself.

Typical processing in this step 508 includes:
Receiving a marker such as a scanned barcode, a selected graphic, a digitized spoken phrase, and so on, and converting the marker to a suitable internal representation (e.g., a unique number);
if the marker has not been previously received, then storing the marker and associating some timing information with the marker to indicate its time of receipt; and/or
if the marker has been previously received, then simply associating some timing information with the marker to indicate its time of receipt.

One of ordinary skill in the art can readily implement the foregoing in a suitable event marker device 104, such as a barcode scanner.

Manipulation of Timestamped Information Streams

FIG. 5 also shows a step 510 of "producing video paper." In FIG. 2, two embodiments of this aspect of the invention were discussed relating to accessing timestamped media. Video paper 232 can be used to access portions of the information stream by selecting a barcode 254 associated with one of the thumbnail images. FIG. 2 also shows a video display device 234 for playing back a timestamped information stream. A video display device can offer the user a greater number of options and controls for accessing the information stream.

FIG. 5 shows a step 512 of "presenting." In accordance with this aspect of the present invention, the idea of "playback" comprises playing a segment of the information stream. For example, the media segment 312 shown in FIG. 3 is a segment associated with the timestamp $M_1$. Alternatively, the information stream can be played back starting from a time based on the time of the selected timestamp. FIG. 3 shows that playback of the information stream can begin at a time 314 prior to the timestamp $M_1$, or at a time 316 subsequent to the timestamp.

It can be appreciated, however, that playback of a timestamped information stream can be initiated from the barcode sheet 204b (FIG. 2) itself, instead of initiating playback from the video paper printout 232. A barcode scanner can be configured to cooperate with a suitably configured playback device via a cable or a wireless connection to perform the desired playback functions. It is noted that the playback device and the record device can be one and the same.

The user can initiate playback by scanning the barcodes on the barcode sheet. Thus, a first "swipe" (scan) of the "uses teeth" barcode, for example, might cause playback of the first point in time in the information stream that is timestamped with the barcode corresponding to the event. A second swipe of the same barcode can cause playback of the information stream at the second timestamp, and so on. Continued swiping of the same barcode could eventually cause the information stream to "wrap" and start playing back from the first occurrence of the timestamp.

Alternatively, all clips associated with a barcode can be played back with a single swipe of the barcode. For example, when the user swipes the "uses teeth" barcode, each clip associated with that barcode can be played back. An appropriate delay between each clip can be provided as a transition from one clip to the next.

In accordance with yet another embodiment, scanning of the ID simply displays a list of all clips associated with that ID. For example, one or more representative thumbnail images for each clip can be displayed. This could be useful for playing back the clips off of the original barcode sheet in the context of any notes that the user has written down without having to print out any video paper.

In one embodiment of the invention, the event marking device 204a (FIG. 2) is a single button barcode scanner. Pushing the button activates the scanning operation and causes the device to read a barcode and store the corresponding ID along with timing information. When the device is coupled to an MFP 206 the ID's and timestamps are sent from the barcode scanner to the MFP and are used to timestamp the recorded stream 212a. Along with the timestamping information, the MFP includes the ID associated with each timestamp in the information for subsequent playback. The barcode scanner may be coupled to a suitably configured display system, such as described in one or more of the above referenced co-pending applications, for playback of the information stream. Activating the scanning operation causes the device to read a barcode and send the corresponding ID to the display system. Upon receiving the identifier, the display system locates one or more timestamps with that ID and displays the corresponding portions of the recorded media. Receiving additional instances of the same ID causes the system to skip to the next corresponding timestamp.

It should be noted that the same device may be used both for timestamping an information stream associated with recorded events and displaying portions of the stream in response to received identifiers. In this case, the device (e.g., MFP) should have a method for switching between "association" mode and "playback" mode. This may be done by a control on the device or by sending a special "mode switch" identifier.

In an alternative embodiment, the barcode scanning device is equipped with two buttons, a RECORD button and a PLAY button. Pressing the RECORD button initiates a scanning action and subsequently the scanned ID is saved to storage with the associated timing information as before. Pressing the PLAY button also initiates a scanning action. In addition, the device then searches its local memory for previously stored events with the same ID. If an event is found, the ID and the timing information associated with that event are sent to the display system. The scanning device may also store a 'PREVIOUS' pointer indicating which event was displayed for the ID. If more than one event is found and a 'PREVIOUS' pointer exists then the next event (e.g., with a later timestamp) for this ID is sent to the display system. If no events are found, the ID may be sent to the display system along with an indication that this is a playback request and cause the display system to locate and display the recorded stream as in other embodiments.

In accordance with another aspect of the invention, the "playback" action can be controlled by the use of task-specific markers. In a particular embodiment of this aspect of the invention, the playback-device might be a DVD player or an audio amplifier. Special "playback control" barcodes can be provided which might represent appropriate playback controls such as "play," "rewind," or "normal loudness." These barcodes might be stickers or some other marking method by which barcodes on a sheet of paper can be arranged to form a custom "remote control card". Thus, in the case of video paper, the printout might have playback control barcodes printed on it. If playback from the original barcode sheet (e.g., 204*b*, FIG. 2) is desired, barcode stickers with predefined functionality can be affixed to the sheet to provide playback control. Alternatively, pre-printed sheets might also include pre-printed "playback control" barcodes.

For example, the video paper 232 of FIG. 2 can include control barcodes for operating the playback device by simply swiping the appropriate control barcode. This is convenient if a barcode scanner is already being used to playback timestamped media, where the media are stored in multiple playback devices. The user would not have to constantly switch between the barcode reader and any one of a number of different remote controls to access her playback environment. Consider the very likely scenario where one or more TV monitors may be connected to multiple source feeds including one or more DVD players, a bank of CD players, video cassette recorders (VCR), and so on, where some of the devices might be daisy-chained so that video from the DVD might feed through the VCR, for example. Manipulating the plethora of remote controls to connect the desired source to the desired monitor can be a very trying experience.

However, if the equipment is provided with computer actuated switches, a video paper with appropriate control barcodes could greatly simplify the playback task. The user simply swipes the barcode corresponding to the desired action. The swiped barcode can then be detected by suitable control software to activate the equipment accordingly to connect the media playback device containing the accessed media to the user's display. Thus, for example, if a barcode corresponding to media on playback device A is swiped, then the control software can control the appropriate switches to connect playback device A to the user's display. If the user next swipes a barcode for which the associate media is on playback device B, the control software can connect together the user's display and playback device B.

In the case where multiple displays are provided, the video paper can include barcodes which indicate the display on which a selected timestamped media segment will be presented. For example, swiping a barcode associated with display device A can be an indication that all subsequent swipes of timestamped media will be presented on display device A, until the user swipes the barcode for a different display device.

The task specific markers might be sets of marker ID's commonly used for particular purposes like filming a "Birthday Party." All Birthday Party pages might have the same ID used for "blowing candles," "eating cake," etc. A special format for each task could be used in generating the printouts. The association between these special ID's and various actions (e.g., the print format) could be made available on a website or other public repository. The ID itself could also code in the address for such information.

In accordance with another aspect of the invention, timestamping can be performed on an information stream that is being played back. The foregoing discussed aspects of the invention are applied to an information stream that is being recorded. That is, the information stream is being timestamped during the recording process.

However, the invention is equally applicable to a previously recorded information stream that is subsequently reviewed. As the user plays back an earlier recorded information stream, she can use an event marker 104 (e.g., a barcode scanner) to mark events she observes during playback to produce a stream of timestamps. These timestamps can then be synchronized with the previously recorded information stream in the same manner as described above. It can be appreciated, therefore, that the timestamping activity does not have to take place during the time the recording is made, but rather can be performed at a time subsequent to the recording.

Still another aspect of the invention is timestamping a previously timestamped information stream. During a review of the previously timestamped information stream, the user can use an event market to further timestamp the information stream. Suppose a user is browsing a timestamped information stream, watching one minute clips, for example. The user might timestamp the clips themselves, to mark something of interest in the clip. More generally, any part of a previously timestamped information stream can be annotated with additional timestamps.

Incorporation of Timestamps into the Information Stream

Figure 6:
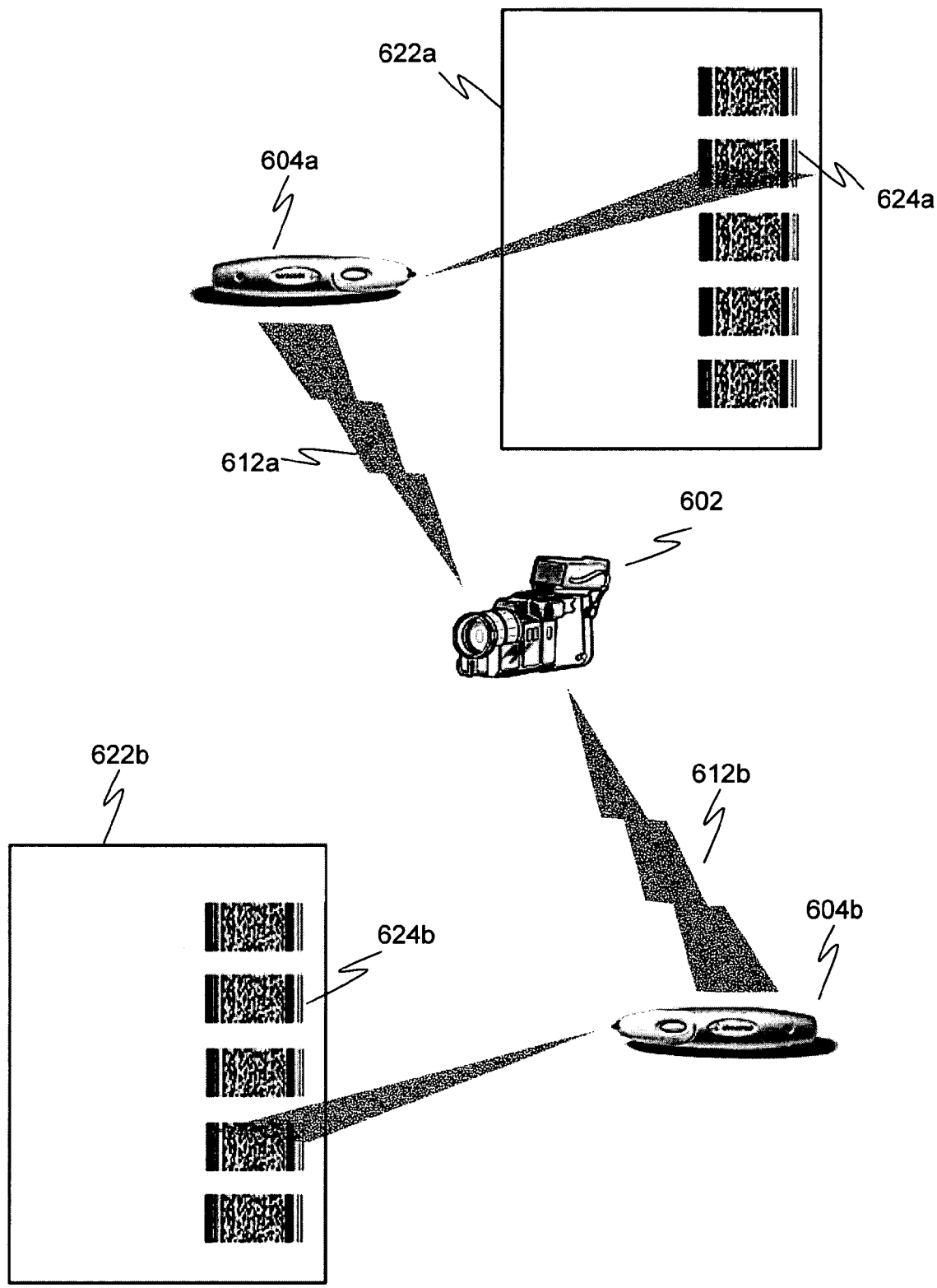
FIG. 6 illustrates an aspect of the invention, showing a configuration wherein timestamps are communicated to the recording device.

In accordance with another aspect of the invention, the timestamps can be incorporated into the information (media) stream as "metadata" to produce a timestamped stream. FIG. 6 shows an illustrative embodiment of this aspect of the invention. A recording device 602 is typically used to provide an information stream; although it can be appreciated that the information stream can be provided from any suitable source. The information stream can be the playing back of an earlier recording of information, or the information stream can be the result of a recording of ongoing activity.

An event marker device 604*a* provides a source of markers for timestamping the information stream. The markers can be transmitted to the recording (or other suitable) device 602 over an appropriate communication path 612*a* (or 612*b*). Alternatively, the markers can be associated with timing information and stored. The stored markers and associated timing information can then be accessed at a later time and transmitted to a playback device to timestamp the information stream. The communication path 612*a* (or 612*b*) can be a wired path; for example, an electrical connection or an optical connection. It may be more convenient in general, however, that the communication path be a wireless path. Many wireless standards are available, for example, infra-red, Bluetooth, and so on.

The device 602 receives the timestamping information and incorporates the information into the stream as metadata to produce a second information stream that includes the timestamp information. A presentation such as the video paper presentation 232 in FIG. 2 can then be directly produced from this second information stream. Since the information stream is "annotated" with the timestamp information, there is no need to access a separate source for the timestamp information, as in the previously described aspects of the invention.

The specific embodiment shown in FIG. 6 includes a pre-printed sheet 622*a* of barcodes. The event marker 604*a* is a barcode scanner that allows a user to timestamp an event by scanning a barcode 624*a* on the sheet. Information indicative of the scanned barcode can be communicated to a suitable recording device wirelessly, where an information stream can be created which incorporates the timestamps.

FIG. 6 shows a further aspect of the invention wherein two or more event markers 604*a*, 604*b* can be used. This configuration allows multiple users to transmit markers to the recording device 602. Each marker would contain some information that identifies the specific user.

It is noted that more than one scanner 604*a*, 604*b* might be used to scan the same barcode or set of barcodes. While the illustration depicts individual sheets 622*a*, 622*b* of paper containing respective barcodes 624*a*, 624*b*, one per scanner, this is not strictly required. In some cases, it is more interesting to share the same sheet of barcodes and annotations with multiple users and scanner devices. For instance, two observers might share a single sheet of barcodes, passing it between them in shifts. In some cases, it is useful to note which particular device is making the event mark. For example, if two police officers were observing a suspect over a long span of time, it might be important to be able to distinguish which officer witnessed which events, yet retain a single log of annotations regarding the overall surveillance by using the same set of barcodes.

Similarly, the recording device can be configured to look for a device identifier in the event markers and respond only to those event markers having a device identifier that matches an identifier associated with the recording device. This configuration allows multiple recording devices to be used. In still another aspect of the invention, event markers may have a list of recording device identifiers, allowing for one or more recording devices to be timestamped by a single transmitted event marker.

Incorporation of the timestamping metadata into an information stream can be accomplished by any of various known techniques for incorporating associated data into an information stream. The specific technique will depend on the nature of the information stream. For example, consider a video stream. Modern video formats provide for a variety ways to include textual metadata information in the video. In closed captioning, analog video and various digital video streams (e.g., various incarnations of the MPEG standard) provide methods for inserting timed textual elements into the video stream. The metadata must be included as a textual element, and must therefore employ an encoding scheme that fits within the allowed character set for the video stream format. A simple method which works well for all formats is to encode using hexadecimal ("hex") notation, wherein every four bits of information is encoded as a hex digit.

Standard NTSC closed captioning allows for 120 characters/sec to be sent, which would allow an annotation (timestamp metadata) every three seconds, or so. It can be appreciated that in the present invention, the timestamp metadata can include timing information, so the metadata need not be placed in precise synchronization with the video, though it is more convenient to do so. The NTSC standard is referred to as EIA-608, or "line 21", closed captioning. For PAL formats, EIA-608 is used on line 22. The DTV standard uses EIA-708 captioning, also known as DTVCC.

Another metadata insertion technique is based on Apple Computer, Inc.'s Quicktime® format, which is closely associated with the MPEG-4 standard. This format includes a text track containing the information. Thus, in an embodiment of this aspect of the invention, the timestamp metadata can be included in a Quicktime® video as a text track where the display of the inserted "text" has been turned off.

Still another metadata insertion technique is based on the Windows Media® format from Microsoft Corporation. This format allows the insertion of content marker objects with textual data to mark specific times in the stream. These objects might contain the entire timestamp metadata. Alternatively, pointer information can be inserted that points to other objects in the stream, such as binary or file objects which contain the metadata package.

An aspect of the present invention provides for the addition of associated information with the metadata that comprises the timestamp, thus allowing for user-provided annotative information in the information stream. For example, the metadata can include biometric information of the user (e.g., fingerprint, voiceprint, retinal scans, and the like) for identification and/or authentication purposes. The metadata can include device specific information about event marking device (e.g., barcode scanner). The user can incorporate textual or spoken annotations into the video track. Recall that an aspect of the invention is the timestamping of recurrences of an event (e.g., "uses scissors") using the same event marker (e.g., barcode). The additional information can be used to further annotate an event; e.g., "uses scissors in a stabbing motion to open the bag."

The metadata information can be unsecured information. This may be appropriate in a usage environment where authentication is not required. For example, a personal video recorder (PVR) can store televisions broadcasts. A notebook having pre-printed barcodes can be provided wherein a user can jot down notes. Interesting points in a program can be noted in the notebook. The associated barcode can then be scanned to timestamp the program to produce an annotated copy of the broadcast. Recurrences of some aspect of the program can be noted by scanning the same barcode; e.g., in a the television broadcast of a golf tournament, the user may designate a barcode as "great tee shot". Each time a player sees what he considers to be a great tee shot, the user can scan that barcode to timestamp the recorded broadcast, and later review all the "great tee shots."

However, it may be important to be able to provide proof of when the timestamping occurred, to provide authenticity of the timestamping device, to notarize an information stream, or to otherwise perform other similar authentication on the information stream. Generally, it may be necessary to be able to verify a recording. Another aspect of the present invention can accommodate such authentication needs.

In this aspect of the invention, the event marking device 604a and the recording device 602 for receiving timestamps from the event marking device can be configured with an encryption method. In a particular embodiment of this aspect of the invention, a public/private key encryption technique is used. Two dimensional barcodes are used because they can hold information of sufficient size. For instance, a barcode containing 128 bits of information is extremely difficult (effectively impossible) to guess if the contents are sufficiently random. Thus, providing a sufficiently large size encoded data stream makes guessing difficult, and 2-D barcodes are the most practical way to make scannable barcodes holding this much data.

An event marking device according to this embodiment of the present invention can be a barcode reader having the following characteristics:

- It contains a public key and a private key (e.g., RSA encryption);
- it is uniquely identifiable among its "universe" of event marking devices;
- it can maintain a clock (time base) to provide "current time"; and/or
- it includes a method for assembling a text string, performing a hash algorithm on the text string, and encrypting the text string.

A receiving (recording) device according to this embodiment can be a video recorder having the following characteristics:

- It contains a public key and a private key (e.g., RSA encryption);
- it is uniquely identifiable among its "universe" of receiving devices;
- it can maintain a clock (time base) to provide "current time";
- it includes a method for assembling a text string, performing a hash algorithm on the text string, and encrypting the text string; and/or
- it includes a method for inserting metadata into a video stream.

This aspect of the invention is directed to authentication of the information stream. Thus, it is likely that the receiving device is a recording device and the information stream is being authenticated as it is being created; i.e. subject of interest is being recorded in real-time. For example, a police car often includes a video recorder so that the behavior of officers can be recorded. An officer might make annotations in his notebook, and scan associated barcodes embossed or otherwise securely printed on the pages of the notebook, causing event marks to be placed in the video stream being recorded. If, at a later time, the tape from the car is reviewed for evidence, the video recording would include information which could be used to prove that the officer was present, and made notebook entries at the time. The officer could then be asked to testify, and his notes could be verified as having been made at a certain location and time.

The foregoing implementation employs public/private key encryption as the encryption technique, and in particular RSA encryption is used. However, asymmetric encryption techniques other than RSA can be used. An aspect of the public/private key encryption technique is the publication of one of the keys. It can be appreciated that in the present invention, such publication is not needed. Therefore, it is recognized that in general any asymmetric encryption technique can be used. In fact, the event marking device can use an encryption technique (whether asymmetric or symmetric) that is different from the encryption technique used in the receiving device. As alluded to, symmetric encryption can be employed. However, the need to secure the key against unauthorized access makes symmetric encryption a less convenient encryption technique.

Figure 7:
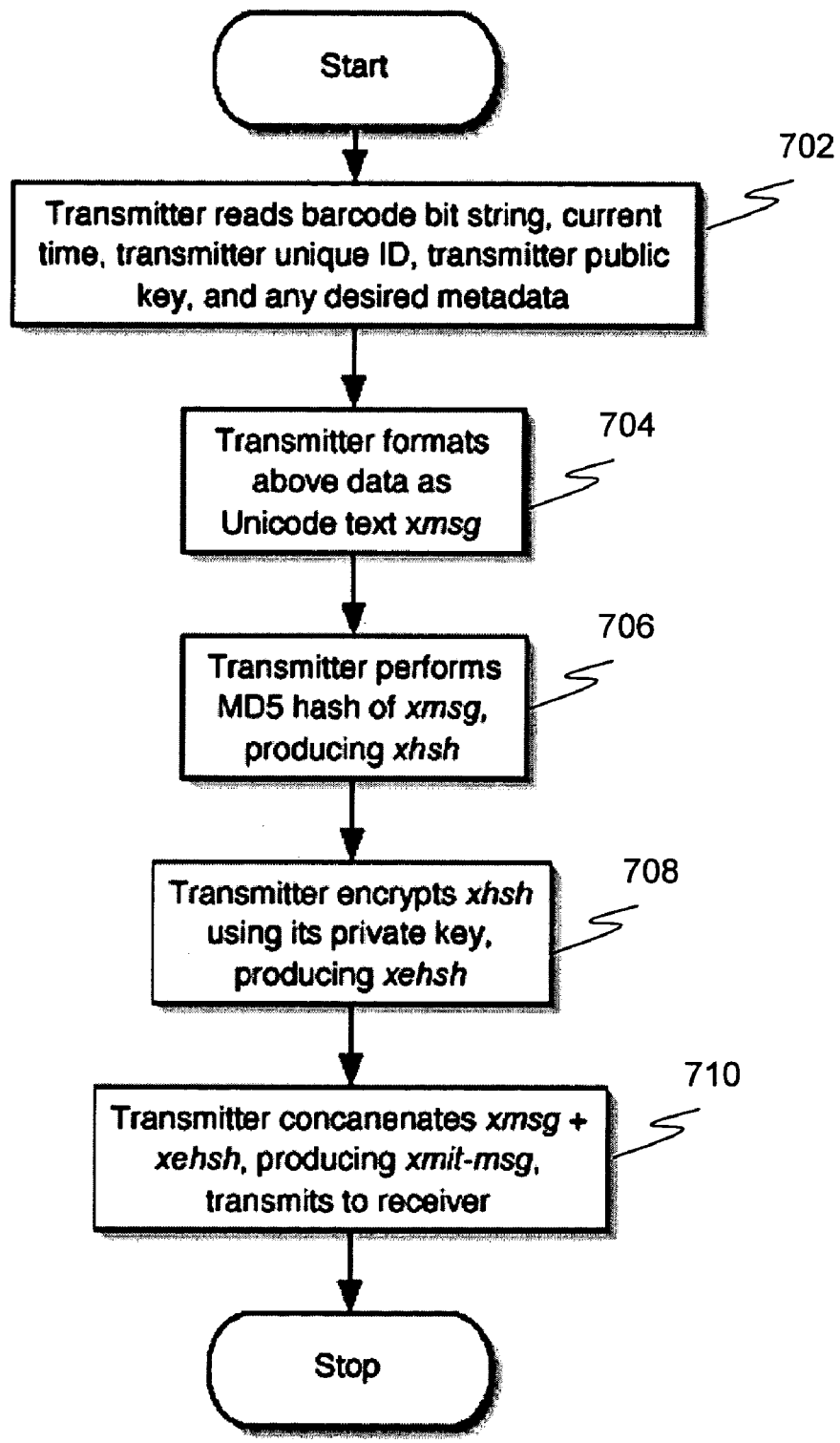
FIG. 7 is a high level flowchart highlighting the steps for packaging a timestamp message for transmission.

Referring now to FIG. 7, a typical process sequence for encoding timestamp metadata for transmission according to the particular embodiment of this aspect of the invention is shown. In a step 702, the event marker 604a (e.g., a barcode reader) is operated to read a barcode. A corresponding bit string representing the scanned barcode is created. A current time is obtained and associated with the barcode bit string. The unique device identifier is also associated with the barcode bit string, along with its associated public key and any other appropriate information. The resulting association of information is a timestamp metadata to be transmitted. In a particular implementation, the metadata might include the following content:

- Cleartext barcode data: 128 bits (32 hex characters hex encoded);
- cleartext timestamp: YYYYMMDDHHMMSS (17 characters);
- cleartext transmitter device ID: 64 bits (16 characters hex encoded);
- cleartext human readable metadata: 111 characters, for example; this can be input via a keyboard or transcribed from a voice interface; and/or
- cleartext public key: 128 bits (32 characters hex encoded).

In a step 704, the foregoing data is formatted into a Unicode text message, "xmsg". In a step 706, the xmsg is subject to an MD5 hash function to produce a hashed message, "xhsh". The hash message is then encrypted, in a step 708, using the device's private key to produce an encrypted message, "xehsh". The text message xmsg and the encrypted message xehsh are then concatenated in a step 710 to produce a transmit message, "xmit-msg". The transmit message includes:

- The contents of "xmsg" shown above;
- a signature composed of "xehsh" (for MD5 hashing, this message can be encoded with 32 hex characters) and/or
- total length=240 characters.

The transmit message is then transmitted by the barcode reader.

Figure 8:
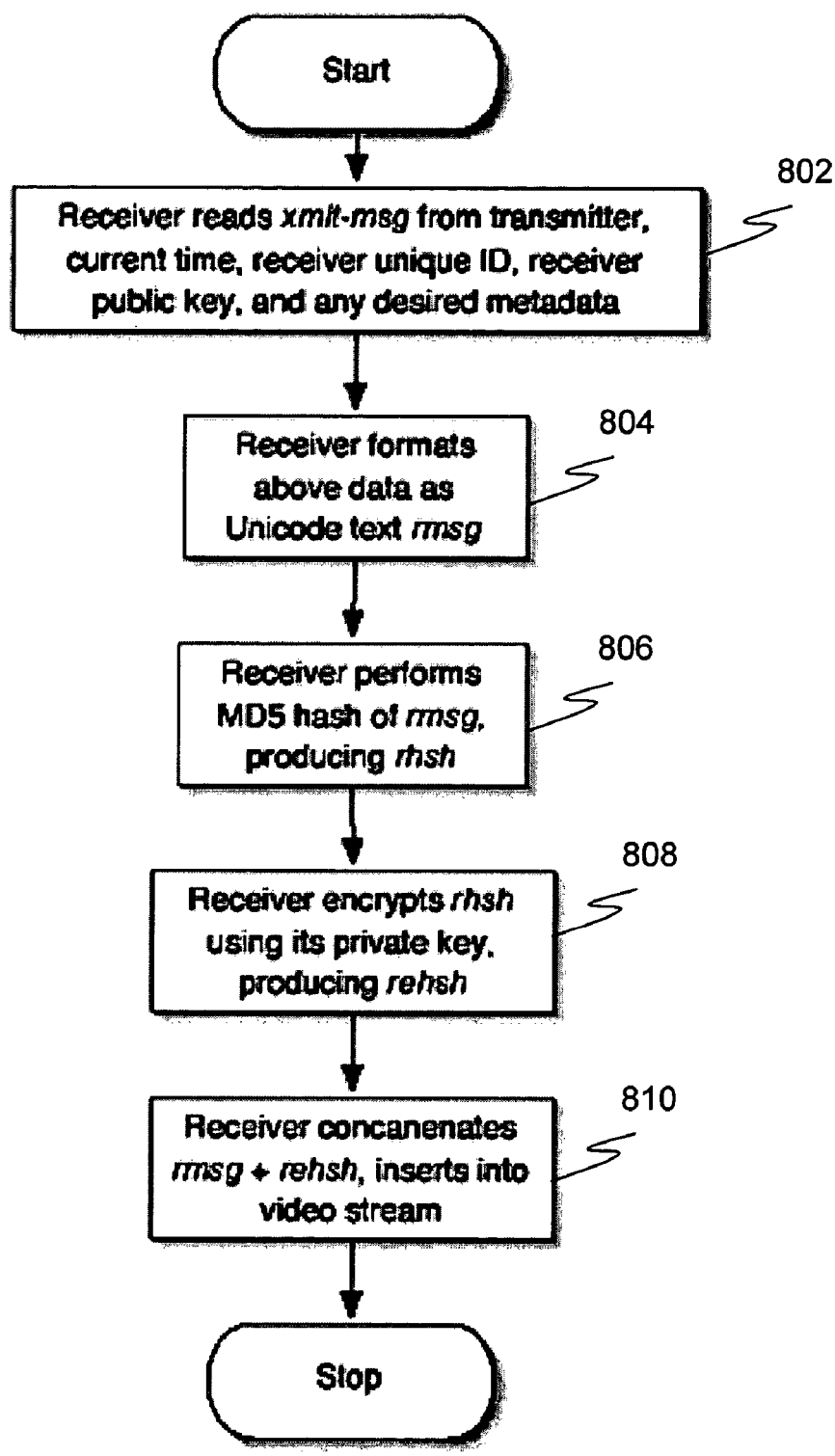
FIG. 8 is a high level flowchart highlighting the steps for processing a received timestamp message.

Referring to FIG. 8, a typical process sequence for incorporating a received message into a video stream according to the particular embodiment of this aspect of the invention is shown. In a step 802, the receiving device receives xmit-msg. A current time is obtained and associated with the received message. The unique receiver device identifier is also associated with the received message, along with its associated public key and any other appropriate information. The resulting association of information might include the following content:

- Cleartext package of the received message (240 characters);
- cleartext timestamp (17 characters);
- cleartext receiver device ID (16 characters hex encoded);

cleartext human readable metadata (24 characters, for example); and/or cleartext receiver public key (32 characters hex encoded).

It can be appreciated that an additional test can be made (though not shown) to determine whether the received xmit-msg is intended for a particular receiving device. It is understood that the xmit-msg must include an identifier of the receiving device, the inclusion occurring at the transmission end. The receiving device can then ignore any marker messages not intended for that device.

The foregoing data is formatted in a step 804 as a Unicode text message, "rmsg". In a step 806, the MD5 hash algorithm is applied to rmsg to produce a hashed message, "rhsh". In a step 808, the hashed message is then encrypted using the receiving device's public key to produce an encrypted message, "rehsh". Finally, in a step 810, a concatenated message is produced comprising rmsg and rehsh. The concatenated message is then inserted into the video stream to produce an authenticated timestamped video stream.

Any user annotations added to the metadata are secure and can be authenticated. The timestamped video stream can be verified to have been sent from a particular transmitter (i.e., event marker such as a barcode scanner) to a particular receiver at a particular time. The user can be verified if biometric information is provided (e.g., scanned fingerprint) or some similarly trusted user authentication method, such as a password, is used.

Figure 9:
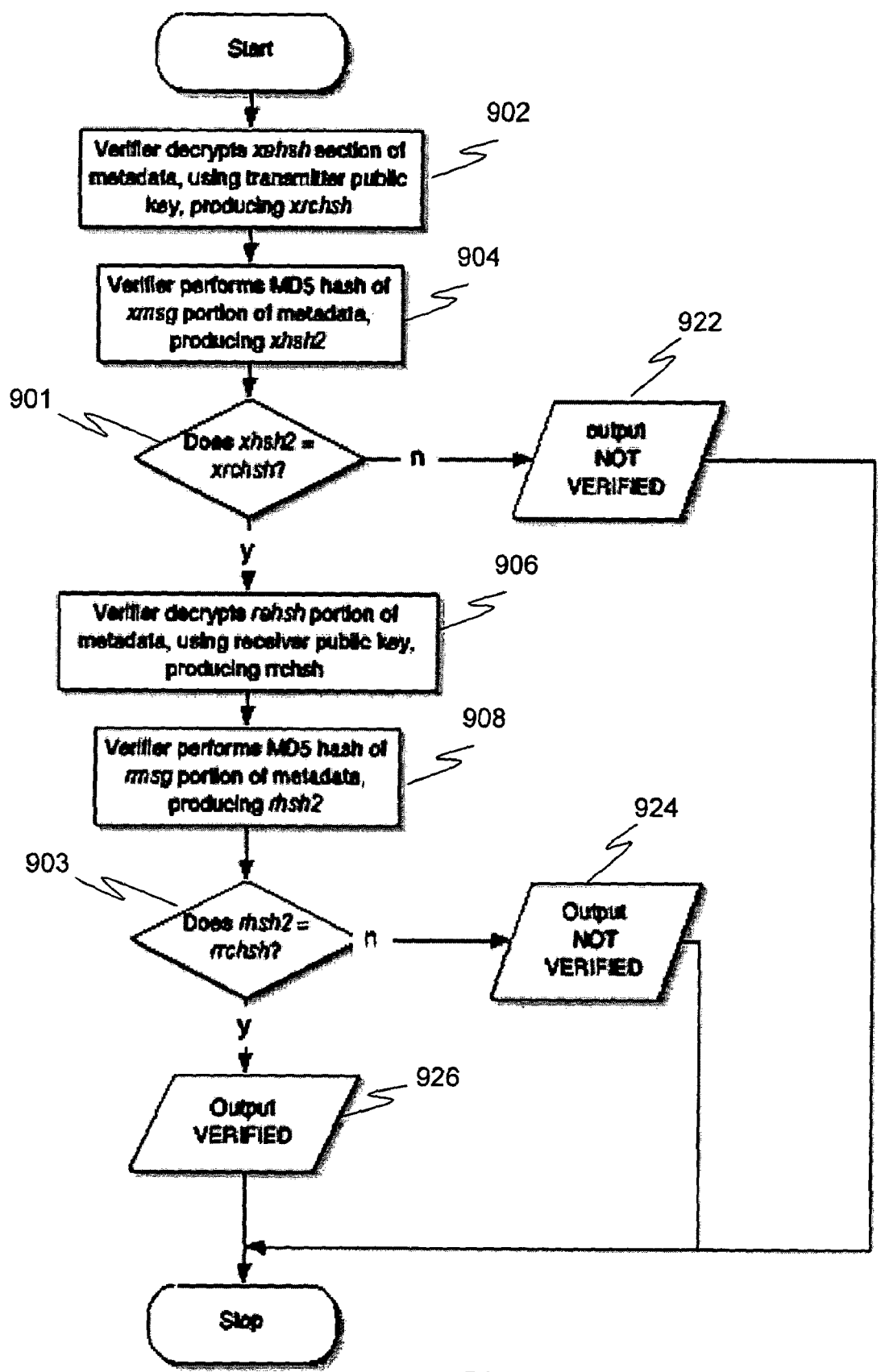
FIG. 9 is a high level flowchart highlighting the steps for verification of a timestamped information stream.

Referring to FIG. 9, a typical processing sequence for verification of a timestamped information stream is shown. The processing can be performed by a playback device that is configured with suitable software to perform the verification process. Alternatively, the process can be performed by human transcription if a visible format of the metadata is made available. Thus, in a step 902, the verifier (whether machine or human) decrypts the xehsh message of the transmitted metadata xmit-msg, using the transmitter public key to produce a decrypted message, "xrchsh". An MD5 hash is performed on the xmsg portion of the transmitted metadata to produce "xhsh2", in a step 904.

Then, a determination is made in a step 901 whether the decrypted message xrchsh matches the "de-hashed" message xhsh2. If a match is not made, then the verification fails and an appropriate response is produced in a step 922. Without such verification, there is no guarantee that the annotation was not forged at a later time by some other device. This algorithm verifies that the information came from a specific encoding device, because only that device would have the private key used to encrypt the MD5 hash of the transmitted message. In cases where such verification is not important, the algorithm can be entered at the step marked 906 in the figure.

If a match is found, then in a step 906 the metadata (rmsg+rehsh) that is incorporated in the timestamped video stream is processed. This includes decrypting the message rehsh using the receiver public key to produce "rrchsh". The MD5 hash is then applied to rmsg, in a step 908 to produce the "de-hashed" message "rhsh2".

In a step 903, a determination is made whether the de-hashed message rhsh2 matches the decrypted message rrchsh. If a match is not found, then in step 924 an appropriate response to the failed verification is performed. If a match is found, then a suitable verification response is made in a step 926.

This aspect of the invention facilitates a multi-user environment. Users can discover other annotation by reviewing the annotated information stream. Conversely, it is convenient to further annotate an information stream by incorporating the additional material into the stream. There is no need to maintain different sources of annotation timestamps, since the annotations are incorporated into the information stream itself.

This aspect of the invention facilitates "notarization" of a real-time data source. The combination of encryption and un-guessable event markers (which can be facilitated by the use of two-dimensional barcodes to hold sufficiently large amounts of randomized data) makes it difficult to "forge" an information stream.

Since the annotations are incorporated into the information stream, "clock drift" between the observer's clock and the data source clock can be avoided. There is no need to ensure synchronous time bases, since the annotations are incorporated into the information stream at the time of receipt of the timestamp. Indeed, the distinction between transmitter time value and data stream time value allows a user to mark a video stream much later than the time it was originally received. For example, a reviewer could mark events in a video years after the original recording date. The date and time is captured directly in the annotations, allowing a later analysis to determine exactly when annotations were added to the stream.

Multi-user timestamping can be summarized by identifying those portions of the timestamped information stream that are associated with a user. Then, for that user, the portions of the timestamped information stream can be represented by an image or the like and grouped according to event marker. This can be repeated for each user. It can be appreciated that this multi-user configuration is applicable whether the timestamp information is stored separately from the information stream, or incorporated into the information stream.

What is claimed is:

1. A method comprising:

generating, by a multi-function peripheral, a set of event identifiers;

subsequent to generating the set of event identifiers, receiving, by the multi-function peripheral, an information stream being recorded by a recording device communicatively coupled with the multi-function peripheral;

while the information stream is being recorded by the recording device:

receiving, by the multi-function peripheral, a first instance of a first event identifier in the set of event identifiers, the receiving of the first instance indicating that a user has selected the first event identifier at a first time during recording of the information stream;

incorporating, by the multi-function peripheral, the first instance of the first event identifier into the information stream at a location in the information stream corresponding to the first time;

receiving, by the multi-function peripheral, a second instance of the first event identifier, the receiving of the second instance indicating that a user has selected the first event identifier at a second time during recording of the information stream;

incorporating, by the multi-function peripheral, the second instance of the first event identifier into the information stream at a location in the information stream corresponding to the second time; and storing, by the multi-function peripheral, the information stream.

2. The method of claim 1 wherein the steps of receiving the first and second instances of the first event identifier include receiving transmitted signals representative of the first event identifier.

3. The method of claim 2 wherein the set of event identifiers comprises a printed sheet of barcode indicia generated by the multi-function peripheral, and wherein the transmitted signals are signals produced by scanning a barcode scanner over one or more of the barcode indicia.

4. The method of claim 1 wherein the set of event identifiers is graphically presented on a video display.

5. The method of claim 1 wherein each of the first and second instances of the first event identifier includes a respective encrypted component, the encrypted component of the first instance being produced at the first time and the encrypted component of the second instance being produced at the second time.

6. The method of claim 5 further comprising employing an asymmetric encryption technique to produce at least one of the encrypted components.

7. The method of claim 5 further comprising employing a symmetric encryption technique to produce at least one of the encrypted components.

8. The method of claim 5 wherein the steps of incorporating the first and second instances include encrypting the first and second instances using an asymmetric encryption technique.

9. The method of claim 5 wherein the steps of incorporating the first and second instances include encrypting the first and second instances using a symmetric encryption technique.

10. The method of claim 1 wherein the first and second instances include metadata, and wherein the steps of incorporating include associating the metadata with the information stream.

11. The method of claim 1 wherein the first instance is received in response to a selection of the first event identifier by a first user, and wherein the second instance is received in response to a selection of the first event identifier by a second user.

12. A multi-function peripheral comprising:
a data processor operable to perform the steps of:
  generating a set of event identifiers;
  subsequent to generating the set of event identifiers, receiving, an information stream being recorded by a recording device communicatively coupled with the multi-function peripheral;
  while the information stream is being recorded by the recording device:
    receiving a first instance of a first event identifier in the set of event identifiers, the receiving of the first instance indicating that a user has selected the first event identifier at a first time during recording of the information stream;
    incorporating the first instance of the first event identifier into the information stream at a location in the information stream corresponding to the first time;
    receiving a second instance of the first event identifier, the receiving of the second instance indicating that a user has selected the first event identifier at a second time during recording of the information stream;
    incorporating the second instance of the first event identifier into the information stream at a location in the information stream corresponding to the second time; and
  storing the information stream.

13. The multi-function peripheral of claim 12 wherein the first and second instances are representative of scanned barcodes.

14. The multi-function peripheral of claim 12 wherein the first and second instances include additional information pertaining to the selections of the first event identifier at the first and second times, the additional information being incorporated into the information stream.

15. The multi-function peripheral of claim 14 wherein the additional information comprises one or more of a first device identifier that identifies a device with which the first event identifier was selected, biometric information representative of a user, and a second device identifier that identifies the recording device.

16. The multi-function peripheral of claim 14 wherein the additional information includes a device identifier that identifies the recording device, and wherein the data processor is further operable to incorporate only information including device identifiers that match the recording device.

17. The multi-function peripheral of claim 12 wherein the data processor is further operable to encrypt the first and second instances.

18. The multi-function peripheral of claim 17 wherein the first and second instances are encrypted using one of an asymmetric encryption technique and a symmetric encryption technique.

19. The multi-function peripheral of claim 18 wherein the first and second instances each comprise a respective encrypted component.

20. The multi-function peripheral of claim 19 wherein each respective encrypted component is encrypted with an encryption key that is associated with a device used to select the identifier.

21. The multi-function peripheral of claim 12 wherein the information stream comprises one of a multimedia data stream, an analog stream, a plurality of image frames, and a stream of sensor data.

* * * * *